May 17, 1960 KAN CHEN 2,937,290

ANTI-COINCIDENT CIRCUIT

Filed June 20, 1957 3 Sheets-Sheet 1

WITNESSES

Edwin E. Bassler

Myron E. Click

INVENTOR

Kan Chen

BY F. E. Browder

ATTORNEY

May 17, 1960 KAN CHEN 2,937,290

ANTI-COINCIDENT CIRCUIT

Filed June 20, 1957 3 Sheets-Sheet 2

United States Patent Office 2,937,290

Patented May 17, 1960

2,937,290

ANTI-COINCIDENT CIRCUIT

Kan Chen, Wilkinsburg, Pa., assignor to Westinghouse Electric Corporation, East Pittsburgh, Pa., a corporation of Pennsylvania Application June 20, 1957, Serial No. 666,957

8 Claims. (Cl. 307—88.5)

This invention relates to operational digital automatic control systems in general and in particular to anti-coincident circuits to be used in such systems.

In an operational digital automatic control system, a reversible binary counter is commonly used as a sensing device to compare command with response of the system. In general, however, a reversible binary counter does not function properly when it receives add-pulses and subtract-pulses which are coincident with each other, either totally or partially. Thus, when the add- and subtract-pulses in a system occur in random time with respect to each other, an anti-coincident circuit has to precede the reversible binary counter so that the add- and subtract-pulses received by the counter are non-coincident.

It is accordingly an object of this invention to provide an improved anti-coincident circuit.

It is a further object of this invention to provide an anti-coincident circuit utilizing logic element components.

Further objects of this invention will become apparent from the following description when taken in conjunction with the accompanying drawings. In said drawings, for illustrative purposes only, are shown preferred forms of the invention.

Figure 1:
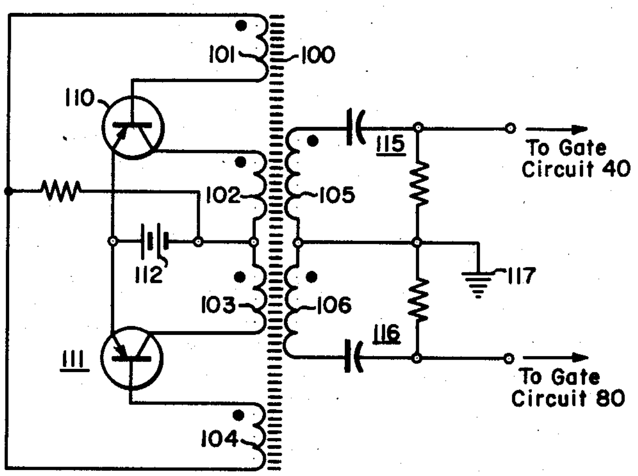
Figure 1 is a schematic diagram of a transistorized oscillator in combination with a pair of differentiating circuits connected to its outputs which may be preferably employed in this invention.

Referring to Fig. 1, there is illustrated a transistorized square-wave oscillator. The R-C network attached to the output winding of the square-wave oscillator acts as a differentiating circuit.

The transistorized square-wave oscillator illustrated in Fig. 1 comprises a saturable magnetic core 100 having inductively disposed thereon four input windings 101, 102, 103 and 104. A direct current supply source 112 is connected to the four input windings 101, 102, 103 and 104 by a pair of three electrode semiconductors 110 and 111 utilized in a switching mode. A pair of output windings 105 and 106 are inductively disposed of the saturable magnetic core 100 and have a common terminal connected to ground at 117. The uncommon terminals of the output windings 105 and 106 are connected, through a pair of differentiating resistor-capacitor networks 115 and 116, respectively, to a pair of gate circuits 40 and 80, respectively.

Figure 2:
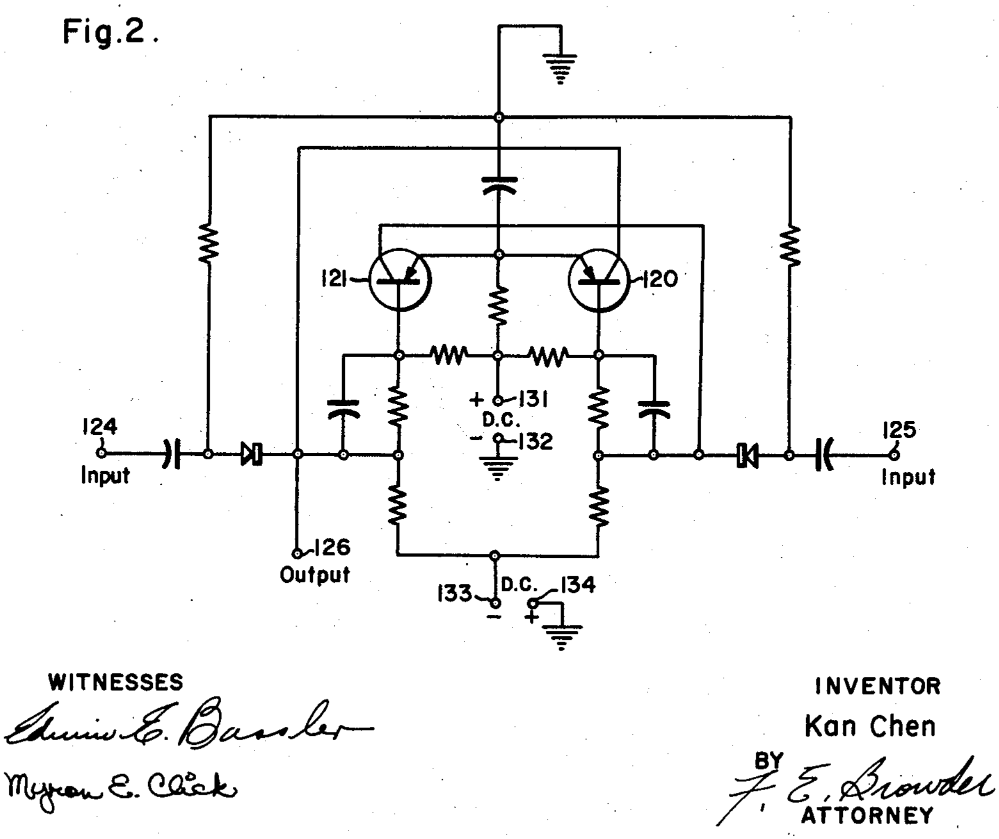
Fig. 2 is a schematic diagram of a transistorized flip-flop element which may be employed in this invention.

Referring to Fig. 2, there is illustrated a transistorized flip-flop element. A flip-flop element is a bistable element which changes states each time a pulse is applied to its input circuit. To meet the common definition of a flip-flop element, the flip-flop element must be able to produce an output after receiving an On input pulse and continue to produce this output until an Off input pulse is received. After receipt of an Off input pulse, the output of the flip-flop element ceases until the receipt of an On input pulse.

The transistorized flip-flop element illustrated in Fig. 2 comprises a pair of three electrode semiconductors 120 and 121 whose emitter-collector circuits are connected to a positive terminal of a direct voltage source, not shown, which is to be connected to a pair of terminals 131 and 132. A negative direct voltage bias source, not shown, is connected to the base electrodes of the semiconductors 120 and 121 by a pair of terminals 133 and 134. The output of the semiconductor 121 is connected to the base electrode of the semiconductor 120 so that when the semiconductor 121 is conducting, the bias on the base electrode of the semiconductor 120 is overcome and the semiconductor 120 is cut off. The output of the semiconductor 120 at the terminal 126 is the output of the flip-flop element illustrated in Fig. 2 and is to be connected to an associated gate circuit. A portion of this output is connected to the base electrode of the semiconductor 121. Therefore, when the semiconductor 120 is conducting, the semiconductor 121 will remain cut off. Positive input signals applied at the terminals 124 and 125 which are connected to the base electrode of the semiconductors 121 and 120, respectively, will change the state of the flip-flop element from On to Off or Off to On as desired.

Figure 3:
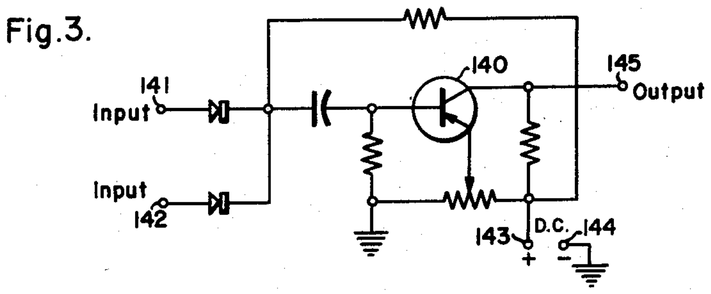
Fig. 3 is a schematic diagram of a gate circuit which may be employed in this invention.

Referring to Fig. 3, there is illustrated a transistorized gate circuit. The gate circuit's function is defined as that of only producing an output or being "gated" whenever all of a plurality of inputs are present.

The gate circuit illustrated in Fig. 3 comprises a three electrode semiconductor 140 having two individual inputs 141 and 142 connected to a base electrode of the semiconductor 140. A positive direct current source, not shown, is connected to the emitter-collector circuit of the semiconductor 140 and the output terminal 145 by a pair of terminals 143 and 144. Means for biasing the semiconductor 140 are connected to the base electrode of the semiconductor 140 by a resistor network. The output of the gate circuit at the terminal 145 is to be connected to an associated gate generator.

Figure 4:
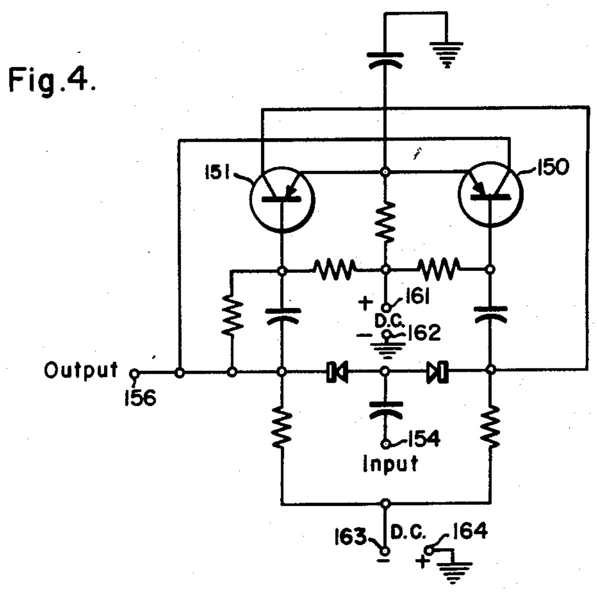
Fig. 4 is a schematic diagram of a transistorized gate generator which may be employed in this invention.

Referring to Fig. 4, there is illustrated a transistorized gate generator or monostable multivibrator. It is similar to the flip-flop circuit of Fig. 2 but is arranged to have only one stable state. Thus, when a signal is delivered into the gate generator, it changes state in a manner similar to the flip-flop element but then returns to its initial state without an additional input signal. Its output is one positive (or negative) pulse for each positive input pulse.

The gate generator illustrated in Fig. 4 comprises a pair of three electrode semiconductors 150 and 151 whose emitter-collector circuits are connected to a positive terminal of a direct-current source, not shown, which is to be connected to a pair of terminals 161 and 162. A negative direct-current bias source, not shown, is connected to the base electrodes of the semiconductors 150 and 151 by a pair of terminals 163 and 164. An input pulse is to be applied at the terminals 154 which is connected to the base electrodes of the semiconductors 150 and 151. The output at the terminal 156 of the gate generator is from the emitter-collector circuit of the semiconductor 150.

The above illustrated circuits of Figs. 1, 2, 3 and 4 are representative of several circuits, which may also be of the magnetic amplifier, electronic tube or relay type, which may preferably be employed to perform their respective functions. However, these circuits do have to be consistently designed, with consideration of the input pulse shape, so that they will function properly when interconnected.

Figure 5:
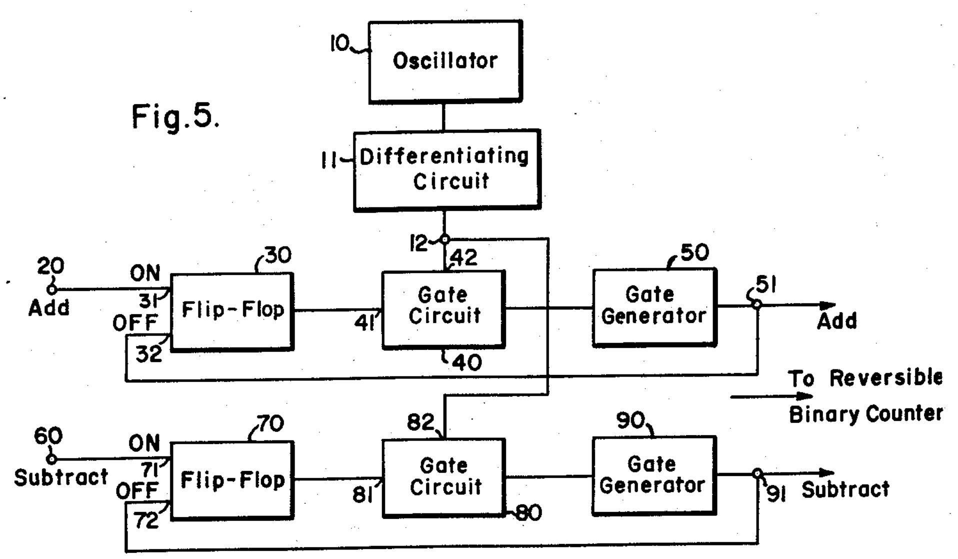
Fig. 5 is a block diagram of an anti-coincident circuit embodying the teachings of this invention.

Referring to Fig. 5, there is illustrated a block diagram of an anti-coincident circuit embodying the teachings of this invention utilizing the circuits hereinbefore described. In general, random add-pulses are received at the terminal 20 and subtract-pulses are received at the terminal 60. After alternate interrogation by the square-wave oscillator circuit 10 and differentiating circuit 11, the pulses appear as properly spaced outputs at the terminals 51 and 91 to be fed to a reversible binary counter.

The add input terminal 20 is connected to the On terminal 31 of the flip-flop element 30. The output of the flip-flop element 30 is connected to an input terminal 41 of the gate circuit 40. The output of the gate circuit 40 is connected to the input of the gate generator 50 whose output appears at the terminal 51. The terminal 51 is connected to an Off input terminal 32 of the flip-flop element 30.

The subtract input terminal 60 is connected to the On input terminal 71 of the flip-flop element 70. The output of the flip-flop element 70 is connected to an input terminal 81 of the gate circuit 80. The output of the gate circuit 80 is connected to the input of the gate generator 90 whose output appears at the terminal 91. The terminal 91 is connected to an Off input terminal 72 of the flip-flop element 70.

The output of the square-wave oscillator 10 is fed through the differentiating circuit 11 to a terminal 12. The terminal 12 is connected to the input terminals 42 and 82 of the gate circuits 40 and 80, respectively.

In operation, the aforementioned task of independent memory and alternate interrogation is performed by the logic circuit of the apparatus illustrated in Fig. 5. The two flip-flop elements 30 and 70 provide independent memory of the random add- and substract-pulses. The flip-flop elements 30 and 70 will be turned on by these random pulses received at the terminals 20 and 60 and will remain on until they are turned off by the corresponding non-coincident add- and subtract-pulses as they appear at the terminals 51 and 91 and are fed back to the Off terminals 32 and 72, respectively. Alternate interrogation is accomplished by the use of the squarewave oscillator 10 and the two gate circuits 40 and 80. The gate circuits 40 and 80 are connected to the opposite phases of the square-wave oscillator 10 output so that they can read the memory or the output of the two flip-flop circuits 30 and 70 at different times. That is, the square-wave oscillator 10 has an output of an alternating square wave, so that one gate circuit is connected to one phase of the oscillator output, say the first 180°, and is sensitive only to that particular phase, and the other gate circuit will be sensitive only to the pulse produced on the next half-cycle or 180°. The frequency of the square-wave oscillator 10 is higher than the maximum frequency of the random add- or subtract-pulses so that all of the pulses arriving at the terminals 20 and 60 will be registered on the reversible binary counter connected to the output terminals 51 and 91 of the anti-coincident circuit.

For further clarity let us take the arrival of two random pulses at the input terminals 20 and 60 and trace the operation of the anti-coincident circuit. A pulse arriving at the input terminal 20 will be conducted to the On input terminal 31 of the flip-flop element 30. This will turn the flip-flop element 30 on and it will continue to produce an output to the gate circuit 40 at the terminal 41. Let us also assume that an input pulse arrived at the terminal 60 at approximately the same time as the pulse arrived at the input terminal 20. This pulse will be conducted to the On terminal 71 of the flip-flop element 70. This will turn the flip-flop element 70 on and it will start producing an output to the terminal 81 of the gate circuit 80. Thus, we have both the flip-flop elements 30 and 70 producing an output to the respective gate circuits 40 and 80.

The square-wave oscillator over a full cycle will produce an alternating square wave, 180° of which is positive and 180° of which is negative. The first half-cycle, being positive, will be of the proper phase to operate the gate circuit 40. Therefore, both of the proper inputs will be present at the terminals 41 and 42 of the gate circuit 40 and there will be an output to the gate generator 50. The gate generator 50 will, as hereinbefore described, produce at its output one pulse of the proper wave shape to operate the reversible binary counter. This output pulse appearing at the terminal 51 will also be fed back to the Off terminal 32 of the flip-flop element 30 and turn the flip-flop element 30 off to a standby state in readiness for the next add pulse.

The first half-cycle of the square-wave oscillator 10, being of a positive phase, will not be the proper phase to operate the gate circuit 80. Therefore, there is no output to the gate generator 90 and thus no output to the terminal 91 that would arrive at the same time as the output from the terminal 51 to the reversible binary counter and cause a malfunction. However, on the next half-cycle of the square-wave oscillator, the output will be of the proper phase to operate the gate circuit 80 since there are now two inputs of the proper phase present at the terminals 81 and 82, and there will be an output to the gate generator 90. The gate generator 90 will produce one pulse that is properly shaped to operate the reversible binary counter. The pulse at the terminal 91 will also be fed back to the Off terminal 72 of the flip-flop element 70, turning the flip-flop element 70 off to a standby state in readiness for the next subtract pulse at the terminal 60.

In Fig. 5 the output from the square-wave oscillator 10 is differentiated by the differentiating circuit 11 before it is fed to the gate circuits 40 and 80. The reason for this is as follows. Suppose that the differentiating circuit 11 is not used. Then a situation described by the wave forms in Fig. 6 may arise. That is, if an add-pulse from the flip-flop element 30 should arrive at the gate circuit 40 near the end of the positive half-cycle of the square-wave oscillator and the subtract-pulse from the flip-flop element 70 should arrive at the gate circuit 80 near the beginning of the negative half-cycle of the square-wave oscillator 10, it would be possible for the gate circuits 40 and 80 to be operated in such a manner as shown in Fig. 6 so that the output pulses of the two gate generators 50 and 90 would partially coincide and cause the reversible binary counter to malfunction.

Figures 6, 7:
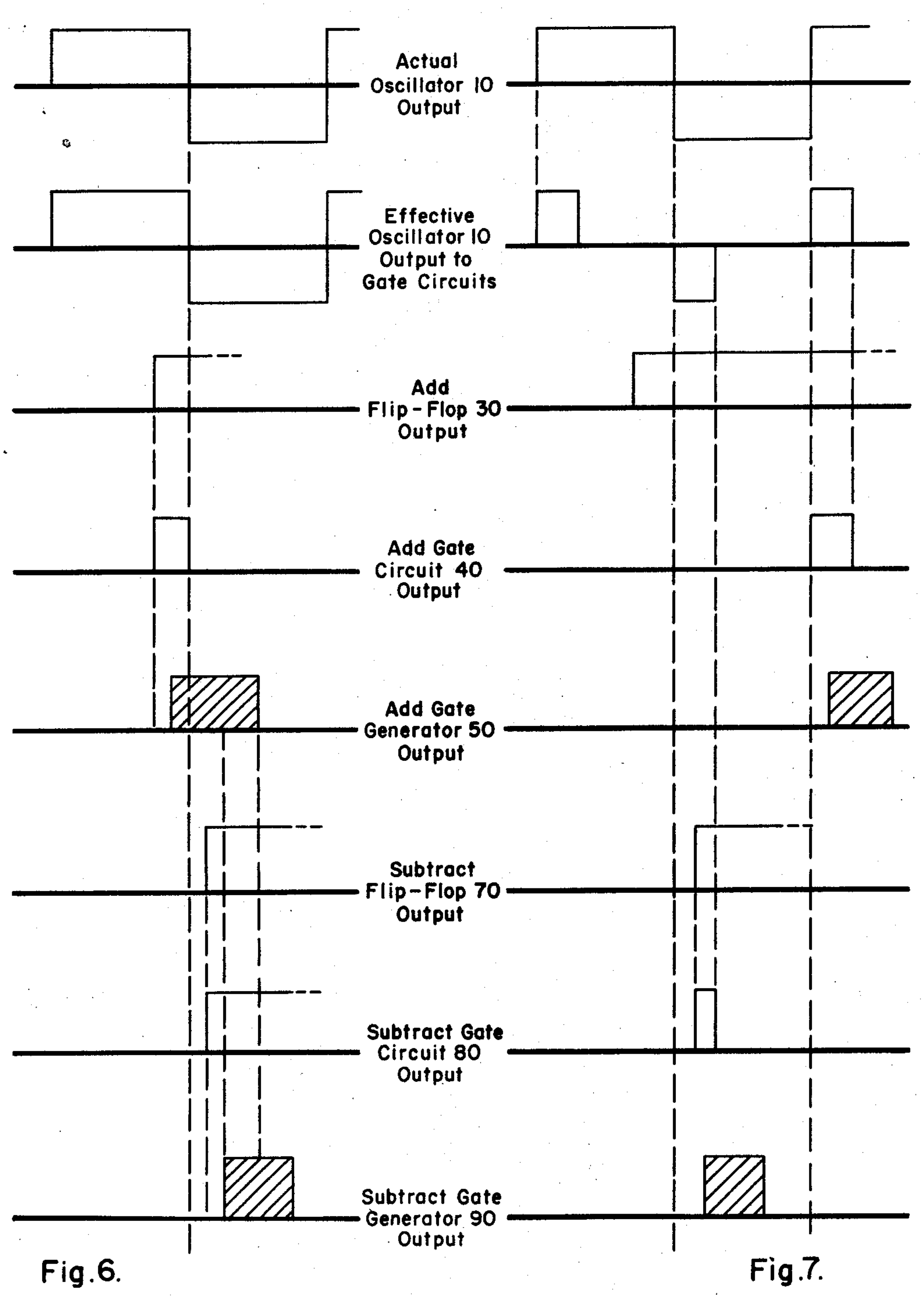
Fig. 6 is a representation of waveforms at selected points of the embodiment illustrated in Fig. 5.
Fig. 7 is a representation of waveforms at selected points of the embodiment illustrated in Fig. 5.

This situation will be avoided if the actual oscillator 10 output pulses are differentiated, so that the duration of the effective output pulses of the oscillator 10 to the gate circuits 40 and 80 is less as shown in Fig. 7. Then the entire duration of the gate generators 50 and 90 output pulses can always be restricted to within a half-cycle period of the actual square-wave oscillator 10 output, and therefore will never overlap.

In conclusion, it is pointed out that while the illustrated example constitutes a practical embodiment of my invention, I do not limit myself to the exact details shown, since modification of the same may be varied without departing from the spirit of this invention.

I claim as my invention:

1. In an anti-coincident circuit operative to prevent the simultaneous application of an add- and a subtract-pulse to a digital counter, in combination, a first flip-flop element responsive to an add-pulse and having its output connected to an associated gate circuit, a second flip-flop element responsive to a subtract-pulse and having its output connected to an associated gate circuit, and an oscillator which alternately interrogates the output of said first and second flip-flop elements by alternately gating each of said gate circuits associated with each said flip-flop element.

2. In an anti-coincident circuit operative to prevent the simultaneous application of an add- and a subtract-pulse to a digital counter, in combination, a first flip-flop element responsive to an add-pulse and having its output connected to an associated gate circuit, a second flip-flop element responsive to a subtract-pulse and having its output connected to an associated gate circuit, and an oscillator which alternately interrogates the output of said first and second flip-flop elements by alternately gating each of said gate circuits associated with each said flip-flop element, the output of each of said gate circuits being fed to a load and also fed back to its respective associated flip-flop element.

3. In an anti-coincident circuit operative to prevent the simultaneous application of an add- and a subtract-pulse to a digital counter, in combination, a first flip-flop element responsive to an add-pulse and having its output connected to an associated gate circuit, a second flip-flop element responsive to a subtract-pulse and having its output connected to an associated gate circuit, and an oscillator in combination with a differentiating circuit which alternately interrogates the output of said first and second flip-flop elements by alternately gating each of said gate circuits associated with each said flip-flop element.

4. In an anti-coincident circuit operative to prevent the simultaneous application of an add- and a subtract-pulse to a digital counter, in combination, a first flip-flop element responsive to an add-pulse and having its output connected to an associated gate circuit, a second flip-flop element responsive to a subtract-pulse and having its output connected to an associated gate circuit, and an oscillator in combination with a differentiating circuit which alternately interrogates the output of said first and second flip-flop elements by alternately gating each of said gate circuits associated with each said flip-flop element, the output of each of said gate circuits being fed to a load and also fed back to its respective associated flip-flop element.

5. In an anti-coincident circuit operative to prevent the simultaneous application of an add- and a subtract-pulse to a digital counter, in combination, a first flip-flop element responsive to an add-pulse and having its output connected to an associated gate circuit, a second flip-flop element responsive to a subtract-pulse and having its output connected to an associated gate circuit, an oscillator which alternately interrogates the output of said first and second flip-flop elements by alternately gating each of said gate circuits associated with each of said flip-flop elements, and a gate generator connected to the output of each of said gate circuits.

6. In an anti-coincident circuit operative to prevent the simultaneous application of an add- and a subtract-pulse to a digital counter, in combination, a first flip-flop element responsive to an add-pulse and having its output connected to an associated gate circuit, a second flip-flop element responsive to a subtract-pulse and having its output connected to an associated gate circuit, an oscillator which alternately interrogates the output of said first and second flip-flop elements by alternately gating each of said gate circuits associated with each of said flip-flop elements, and a gate generator connected to the output of each of said gate circuits, the output of each of said gate generators being fed to a load and also fed back to its respective associated flip-flop element.

7. In an anti-coincident circuit operative to prevent the simultaneous application of an add- and a subtract-pulse to a digital counter, in combination, a first flip-flop element responsive to an add-pulse and having its output connected to an associated gate circuit, a second flip-flop element responsive to a subtract-pulse and having its output connected to an associated gate circuit, an oscillator in combination with a differentiating circuit which alternately interrogates the output of said first and second flip-flop elements by alternately gating each of said gate circuits associated with each of said flip-flop elements, and a gate generator connected to the output of each of said gate circuits, the output of each of said gate generators being fed to a load and also fed back to its respective associated flip-flop element.

8. In an anti-coincident circuit operative to prevent the simultaneous application of an add- and a subtract-pulse to a digital counter, in combination, a first flip-flop element responsive to an add-pulse and having its output connected to an associated gate circuit, a second flip-flop element responsive to a subtract-pulse and having its output connected to an associated gate circuit, a square-wave oscillator in combination with a differentiating circuit which alternately interrogates the output of said first and second flip-flop elements by alternately gating each of said gate circuits associated with each of said flip-flop elements, and a gate generator connected to the output of each of said gate circuits, the output of each of said gate generators being fed to a load and also fed back to its respective associated flip-flop element.

References Cited in the file of this patent

UNITED STATES PATENTS

| | | |
|---|---|---|
| 2,575,037 | Baker | Nov. 13, 1951 |
| 2,591,961 | Moore et al. | Apr. 8, 1952 |
| 2,612,621 | Shepherd et al. | Sept. 30, 1952 |